United States Patent Office 3,225,054
Patented Dec. 21, 1965

3,225,054
4-DIPROPYLAMINO-2-ARYL-2-PYRIDYL-ALKANAMIDES
John W. Cusic, Skokie, and Henry W. Sause, Deerfield, Ill., assignors to G. D. Searle & Co., Chicago, Ill., a corporation of Delaware
No Drawing. Filed July 3, 1962, Ser. No. 207,433
3 Claims. (Cl. 260—295)

The present application is a continuation-in-part of our copending application, Serial No. 110,653, filed May 17, 1961, now abandoned.

The present invention relates to 4-dipropylamino-2-aryl-2-pyridylalkanamides. More specifically, it relates to compounds having the following general formula

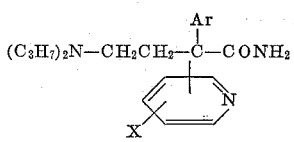

wherein Ar is selected from the group consisting of phenyl, tolyl, xylyl, naphthyl, halophenyl, anisyl, and dimethoxyphenyl; and X is selected from the group consisting of hydrogen and halogen. The halophenyl radicals referred to above can be fluorophenyl, chlorophenyl, bromophenyl, or iodophenyl. Likewise, the halogen radicals referred to above can be fluorine, chlorine, bromine, or iodine. Both n-propyl and isopropyl radicals are encompassed by the $C_3H_7$ radicals designated above.

To prepare the compounds of the present invention, an appropriate arylacetonitrile of the formula $ArCH_2CN$ is converted to the alkali metallo derivatives (e.g., by heating with sodamide), and this is condensed with a compound of the formula

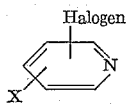

in an inert solvent such as toluene to give a compound of the formula

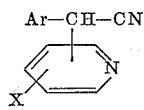

wherein Ar and X have the values described above. This α-aryl-α-pyridylacetonitrile is further heated with sodamide and a 2-dipropylaminoethyl halide of the formula $(C_3H_7)_2N—CH_2CH_2$—Halogen in an inert solvent such as toluene to give a nitrile of the formula

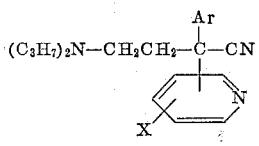

Alternately, the above 2-step procedure can be modified so that both reactions are accomplished in a single step. This can be done by carrying on the reaction between the arylcetonitrile and the halopyridine as before, but using enough sodamide for carrying out both steps. Once the first step is complete, the dipropylaminoethyl halide is added to the resultant reaction mixture without isolating the intermediate α-aryl-α-pyridylacetonitrile.

Two methods are available for hydrolyzing the intermediate nitriles to the amides of the present invention. The nitrile can be heated with concentrated sulfuric acid, or, if the compound is sensitive to sulfuric acid, the intermediate nitrile can be refluxed with alcoholic alkali to give the desired amide.

The organic bases of this invention form non-toxic, acid-addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds of this invention possess valuable pharmacological properties. In particular, they possess a quinidine-like eurhythmic activity but they fail to produce some of the unfavorable side reactions of quinidine. Thus, for example, their effect on coronary flow is not significant. In addition, the compounds of this invention act as central nervous system stimulants as evidenced by the fact that they reduce hexobarbital sleep time in experimental animals. The compounds of the present invention also possess diuretic activity and anti-inflammatory activity. The anti-inflammatory activity is demonstrated by their phenylbutazone-like effect on edematous conditions.

The compounds which constitute this invention and their preparation will appear more fully from a consideration of the following examples which are given for purposes of illustration only and are not to be construed as limiting the invention in spirit or scope. In these examples, quantities are indicated in parts by weight, temperatures in degrees centigrade (° C.), and pressures in millimeters of mercury (mm.).

*Example 1*

To a solution of 35.3 parts of phenylacetonitrile and 47.6 parts of 2-bromopyridine in 175 parts of dry toluene is added 53.4 parts of sodamide slowly with stirring over a period of 45 minutes. The resultant mixture is stirred at 100° C. for two hours before it is cooled and the excess sodamide is decomposed by the addition of water. The toluene layer is separated and washed with water to remove excess alkali. The toluene solution is extracted with 6 N hydrochloric acid and the acid extract is made alkaline and then extracted with toluene. The toluene solution is dried over sodium sulfate and the solvent is evaporated. Recrystallization of the residue from alcohol-hexane gives α-phenyl-2-pyridineacetonitrile melting at about 87–88° C.

If the above procedure is repeated and 4-chlorophenylacetonitrile is substituted for the phenylacetonitrile, the product is α-(4-chlorophenyl)-2-pyridineacetonitrile melting at about 67.5–68° C. after recrystallization from ethanol.

*Example 2*

A solution of 46.8 parts of phenylacetonitrile and 45.4 parts of 4-chloropyridine in 175 parts of dry toluene is prepared and 31.7 parts of sodamide is added slowly over a period of 45 minutes with stirring. The mixture is heated and stirred at 100° C. until it becomes light brown in color which occurs after about 2 hours. Water is added to the cooled reaction mixture to decompose the excess sodamide and the toluene layer is separated and washed with water to remove excess alkali. The toluene solution is extracted with 6 N hydrochloric acid and the extracts are alkalized and extracted with toluene. The toluene is dried over sodium sulfate and the solvent is evaporated. The residue is distilled to give α-phenyl-4-pyridieneacetonitrile boiling at about 133–136° C. at 0.35 mm. pressure. This product melts at about 76–76.5° C. after recrystallization from benzene-hexane.

Substitution of equivalent quantities of the appropriate arylacetonitrile and halopyridine for the phenylacetonitrile and the 4-chloropyridine in the above procedure gives the following compounds:

α-Phenyl-2-(5-chloropyridine)acetonitrile boiling at about 150° C. at 0.8 mm. pressure.

α-Phenyl-3-pyridineacetonitrile boiling at about 145–150° C. at 0.5 mm. pressure.

α-(3,4-dimethoxyphenyl)-2-pyridineacetonitrile boiling at about 175–178° C. at 0.1 mm. pressure.

α-(4-fluorophenyl) - 2-pyridineacetonitrile boiling at about 125–129° C. at 0.5 mm. pressure.

α-(4-iodophenyl)-2-pyridineacetonitrile.
α-(2-fluorophenyl)-2-pyridineacetonitrile.
α-(4-methoxyphenyl)-2-pyridineacetonitrile.
α-(3,5-dimethylphenyl)-2-pyridineacetonitrile.

*Example 3*

A solution of 52 parts of 3-tolylacetonitrile and 65 parts of 2-bromopyridine in 435 parts of dry toluene is heated at 80° C. The reaction mixture is kept at about 80–85° C. while 33 parts of sodamide is added portionwise over a period of 75 minutes. The reaction mixture is then heated at 105° C. for one hour before 82 parts of 2-diisopropylaminoethyl chloride in 130 parts of dry toluene is added portionwise over a period of one hour while the temperature is maintained at 105–108° C. The reaction mixture is heated for an additional 3.5 hours at 108–110° C. The resultant mixture is allowed to stand for about 12 hours and 200 parts of water is added. The toluene layer is separated and the solvent is evaporated to leave a dark oil. This oil is distilled to give 4-diisopropylamino-2-(3-tolyl)-2-(2-pyridyl)butyronitrile boiling at about 164–168° C. at 0.2 mm. pressure.

The above procedure is repeated, but in this case the reactants are 84 parts of α-naphthylacetonitrile, 80 parts of 2-bromopyridine, 43 parts of sodamide, and 100 parts of 2-diisopropylaminoethyl chloride. Isolation of the product in the manner described above gives 4-diisopropylamino - 2-(α-naphthyl) - 2-(2 - pyridyl)butyonitrile boiling at about 196–202° C. at 0.2 mm. pressure.

If the above procedure is repeated using 29 parts of phenylacetonitrile, 40 parts of 2-bromopyridine, 21 parts of sodamide, and 65 parts of 2-dipropylaminoethyl chloride as the reactants, the product is 4-dipropylamino-2-phenyl-2-(2-pyridyl)butyronitrile boiling at about 164–165° C. at 0.1 mm. pressure.

*Example 4*

To a solution of 41 parts of α-phenyl-4-pyridineacetonitrile in 350 parts of dry toluene is added 9.2 parts of sodamide and the mixture is stirred and heated at 90° C. for 30 minutes. Heating is stopped and a solution of 38.5 parts of 2-diisopropylaminoethyl chloride in 110 parts of dry toluene is added slowly over a period of 30 minutes. The mixture is stirred and refluxed for 6 hours before it is cooled and decomposed by the addition of water. The toluene layer is separated and washed with water and extracted with 6 N hydrochloric acid. The acid extract is made alkaline and extracted with toluene. The toluene solution is washed with water and dried and the solvent is evaporated. Distillation of the residue gives 4-diisopropylamino-2-phenyl-2 - (4-pyridyl)butyronitrile boiling at about 164–168° C. at 0.7 mm. pressure.

*Example 5*

If equivalent quantities of the appropriate starting material are used and the procedure of Example 4 is repeated, the following compounds are obtained:

4-diisopropylamino - 2-phenyl - 2 - (2-pyridyl)butyronitrile boiling at about 145–160° C. at 0.3 mm. pressure.

4-diisopropylamino - 2-phenyl - 2 - (3-pyridyl)butyronitrile boiling at about 180–190° C. at 0.3 mm. pressure.

4-diisopropylamino - 2-phenyl-2 - [2 - (5-chloropyridyl)]butyronitrile boiling at about 165–172° C. at 0.25 mm. pressure.

4-diisopropylamino-2-(3,5-dimethylphenyl)-2 - (2-pyridyl)butyronitrile.

4-diisopropylamino - 2-(4-methoxyphenyl)-2 - (2-pyridyl)butyronitrile.

4-diisopropylamino - 2-(3,4-dimethoxyphenyl) - 2-(2-pyridyl)butyronitrile boiling at about 185–190° C. at 0.1 mm. pressure.

4-diisopropylamino - 2 - (4-chlorophenyl) - 2-(2-pyridyl)butyronitrile boiling at about 176–179° C. at 0.4 mm. pressure.

4-diisopropylamino-2-(4-fluorophenyl) - 2-(2-pyridyl)butyronitrile boiling at about 154° C. at 0.4 mm. pressure.

4-diisopropylamino-2-(2-fluorophenyl) - 2-(2-pyridyl)butyronitrile.

4-diisopropylamino-2-(4-iodophenyl)-2 - (2-pyridyl)butyronitrile.

*Example 6*

A solution of 27.2 parts of 4-diisopropylamino-2-phenyl-2-(2-pyridyl)butyronitrile in 200 parts of concentrated sulfuric acid is heated on a steam bath for 4 hours and then poured onto ice. The resultant mixture is alkalized with 10 N sodium hydroxide, and the pH is adjusted to 6 by the addition of acetic acid. The solution is washed once with benzene before it is alkalized again with 10 N sodium hydroxide solution. The resultant mixture is extracted with benzene, and the solvent is evaporated from the benzene extract. The resultant residue is dissolved in ethanol and the alcohol solution is treated with charcoal and filtered. Evaporation of the solvent leaves a residue which is recrystallized from hexane to give 4-diisopropylamino-2-phenyl-2-(2-pyridyl)butyramide melting at about 94.5–95° C. This compound has the following formula:

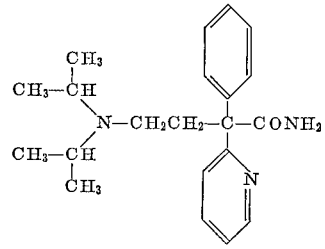

*Example 7*

A solution of 7 parts of 4-diisopropylamino-2-phenyl-2-(3-pyridyl)butyronitrile in 149 parts of concentrated sulfuric acid is heated on a steam bath for 4 hours and then poured onto ice. The resultant mixture is alkalized with 10 N sodium hydroxide solution and acetic acid is added until the pH of the solution is 6. After the solution is washed with benzene, it is alkalized again with 10 N sodium hydroxide solution and extracted with benzene. Evaporation of the solvent from the benzene extract leaves a residue which is dissolved in alcohol. The alcohol solution is treated with charcoal and filtered and the solvent is evaporated to leave an oil which is 4-diisopropylamino-2-phenyl-2-(3-pyridyl)butyramide.

*Example 8*

22 parts of 4-diisopropylamino-2-phenyl-2-(4-pyridyl)butyronitrile is dissolved in 415 parts of concentrated sulfuric acid and heated on a steam bath for 4 hours. The resultant mixture is poured onto ice and alkalized with 10 N sodium hydroxide solution. The pH of the solution is adjusted to 6 by the addition of acetic acid and the resultant solution is washed once with benzene. The solution is alkalized with 10 N sodium hydroxide solution and extracted with benzene. Evaporation of the solvent from the benzene extract leaves a residue which is dissolved in ethanol. After treatment of the ethanol solution with charcoal, it is filtered and the solvent is evaporated. The residue is recrystallized from a mixture of hexane and 2-propanol to give 4-diisopropylamino-2-phenyl-2-(4-pyridyl)butyramide melting at about 138.5–139° C.

Example 9

A solution of 4.4 parts of 4-diisopropylamino-2-phenyl-2-2[2-(5-chloropyridyl)]butyronitrile in 90 parts of concentrated sulfuric acid is heated on a steam bath for 4 hours and poured onto ice. The resultant mixture is alkalized with 10 N sodium hydroxide solution and the pH of the solution is adjusted to 6 by the addition of the acetic acid. The solution is washed once with benzene, and alkalized with 10 N sodium hydroxide solution. Extraction of the mixture with benzene and evaporation of the solvent from the benzene extract leaves a residue which is dissolved in ethanol. The ethanol is treated with charcoal and filtered and the solvent is evaporated to leave a residue which is 4-diisopropylamino-2-phenyl-2-[2-(5-chloropyridyl)]butyramide.

Example 10

25 parts of 4-dipropylamino-2-phenyl-2-(2 - pyridyl)butyronitrile is dissolved in 185 parts of concentrated sulfuric acid and heated on a steam bath for 4 hours. The procedure used to isolate the crude product is the same as that described in Example 6. The crude product is recrystallized from hexane to give 4-dipropylamino-2-phenyl-2-(2pyridyl)butyramide melting at about 63–64° C.

Example 11

A solution of 34.8 parts of 4-diisopropylamino-2-(4-chlorophenyl)-2-(2-pyridyl)butyronitrile in 460 parts of concentrated sulfuric acid is heated for 4 hours on a steam bath. The mixture is poured onto ice and the procedure used in the isolation of the product is the same as that used in Example 6. The product, which is 4-diisopropylamino-2-(4-chlorophenyl) - 2 - (2 - pyridyl)butyramide, is a gum in this instance.

Example 12

A solution of 8.97 parts of 4-diisopropylamino-2-(4-fluorophenyl)-2-(2-pyridyl)butyronitrile in 92 parts of concentrated sulfuric acid is heated on a steam bath for 4 hours. The reaction mixture is poured onto ice and the procedure used in the isolation of the crude product is the same as that used in Example 6. In this case the crude product is recrystallized from pentane to give 4-diisopropylamino-2-(4-fluorophenyl)-2-(2 - pyridyl)butramide melting at about 77–78° C. This product has the following formula:

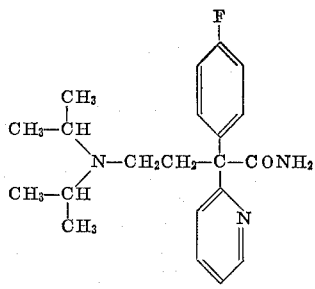

If equivalent quantities of the appropriate nitrile are used and the above procedure is repeated, the following compounds are obtained:

4-diiosopropylamino-2-(2-fluorophenyl)-2-(2 - pyridyl)butyramide.

4-diisopropylamino-2-(4-iodophenyl)-2 - (2 - pyridyl)butyramide.

Example 13

15 parts of 4-diisoprpylamino-2-(α-naphthyl) - 2 - (2-pyridyl)butyronitrile is dissolved in 170 parts of concentrated sulfuric acid and heated on a steam bath for 4 hours. After the mixture is poured onto ice, the crude product is isolated by the same procedure used in Example 6. In this instance, the crude product is recrystallized from a mixture of hexane and ether to give 4-diisopropylamino-2-(α-naphthyl)-2-(2-pyridyl) butyramide melting at about 152–155° C.

Example 14

A mixture of 25 parts of 4-diisopropylamino-2 - (3-tolyl)-2-(2-pyridyl)butyronitrile, 48 parts of potassium hydroxide, 100 parts of ethanol, and 4 parts of water is refluxed for 21 hours. The reaction mixture is poured into 600 parts of water and the resultant mixture is extracted twice with ether. The combined ether extracts are dried and the solvent is evaporated. Pentane is added to the residue to make it crystallize. The resultant solid is recrystallized from a mixture of ether and hexane to give 4-diisopropylamino-2-(3-tolyl)-2-(2 - pyridyl)butyramide melting at about 113–114° C.

Example 15

Hydrolysis of 4-diisoprpylamino-2 - (3,4 - dimethoxyphenyl)-2-(2-pyridyl)butyronitrile is effected by the same procedure described in Example 14. In this case the product is 4-diisopropylamino-2-(3,4-dimethoxyphenyl) - 2-(2-pyridyl)butyramide melting at about 102–103° C. In the same way, 4-diisopropylamino-2-(4-methoxyphenyl) - 2-(2-pyridyl)butyronitrile and 4-diisopropylamino-2 - (3,5-dimethylphenyl)-2-(pyridyl)butyronitrile are hydrolyzed to 4-diisopropylamino-2-(4-methoxyphenyl)-2-(2-pyridyl)butyramide and 4-diisopropylamino-2-(3,5-dimethylphenyl)-2-(2-pyridyl)butyramide respectively.

What is claimed is:

1. A compound of the formula

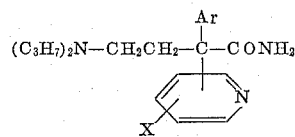

wherein Ar is selected from the group consisting of phenyl, tolyl, xylyl, naphthyl, halophenyl, anisyl, and dimethoxyphenyl; X is selected from the group consisting of hydrogen and chlorine.

2. A compound of the formula

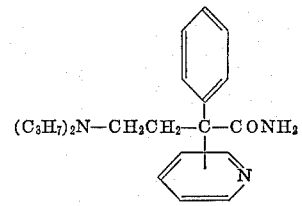

3. 4-diisopropylamino-2-phenyl-2 - (2 - pyridyl)butyramide.

References Cited by the Examiner

UNITED STATES PATENTS

| | | | |
|---|---|---|---|
| 2,823,233 | 2/1958 | Speeter | 260—294 |
| 2,841,589 | 7/1958 | Brandstrom et al. | 260—294 |
| 2,959,362 | 9/1960 | Schuler et al. | 260—294 |

OTHER REFERENCES

Janssen et al.: "Arch. Int. de Pharmacodynamic," Vol. 103, pp. 82–5, 84–91 (1955).

WALTER A. MODANCE, *Primary Examiner.*

NICHOLAS S. RIZZO, *Examiner.*